United States Patent
Joza

(10) Patent No.: US 9,707,805 B2
(45) Date of Patent: Jul. 18, 2017

(54) PNEUMATIC TIRE AND METHOD OF MANUFACTURING THE SAME

(71) Applicant: The Yokohama Rubber Co., LTD., Minato-ku, Tokyo (JP)

(72) Inventor: Ayako Joza, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 498 days.

(21) Appl. No.: 13/851,238

(22) Filed: Mar. 27, 2013

(65) Prior Publication Data

US 2014/0027035 A1   Jan. 30, 2014

(30) Foreign Application Priority Data

Mar. 27, 2012   (JP) ................. 2012-071807

(51) Int. Cl.
*B60C 13/00* (2006.01)
*B60C 13/02* (2006.01)

(52) U.S. Cl.
CPC ............ *B60C 13/001* (2013.01); *B60C 13/02* (2013.01)

(58) Field of Classification Search
CPC .............................. B60C 13/001; B60C 13/02
USPC ......................................................... 152/525
See application file for complete search history.

(56) References Cited

U.S. PATENT DOCUMENTS

| | | | | |
|---|---|---|---|---|
| 2,761,489 A | * | 9/1956 | Kraft ............................ | 156/116 |
| 3,253,634 A | * | 5/1966 | De Young .................... | 152/523 |
| 5,049,609 A | * | 9/1991 | Patitsas ................. | B60C 13/002 524/386 |
| 6,916,221 B2 | * | 7/2005 | Kaltenbach et al. ............. | 445/3 |
| 2003/0084979 A1 | * | 5/2003 | Matsumoto .................... | 152/523 |
| 2006/0207708 A1 | * | 9/2006 | Vylasek ............... | B60C 13/002 152/524 |

FOREIGN PATENT DOCUMENTS

| | | | | |
|---|---|---|---|---|
| JP | H7-37713 | | 7/1995 | |
| JP | 2004-526814 | | 9/2004 | |
| JP | 2004299662 A | * | 10/2004 | ............ B60C 13/00 |
| JP | 2007022367 A | * | 2/2007 | |
| JP | 2008-174639 | | 7/2008 | |
| JP | 2009-538768 | | 11/2009 | |
| KR | 823429 B1 | * | 4/2008 | ............ B60C 13/02 |
| KR | 100823429 B1 | * | 4/2008 | ............ B60C 13/02 |

OTHER PUBLICATIONS

Machine Translation: JP 2004299662 A; Kuno et al.; no date.*
Machine Translation: JP 2007022367 A; Nakano, Tomoya; no date.*
Machine Translation: KR 100823429 B1; Kim Jung Nam; no date.*

* cited by examiner

*Primary Examiner* — Michael H Wilson
*Assistant Examiner* — Kendra Ly
(74) *Attorney, Agent, or Firm* — Thorpe North & Western

(57) ABSTRACT

To provide a pneumatic tire that can prevent reflective material from falling off and can maintain visibility and fashionability based on the reflective material over a long period of time when providing a decorative portion decorated with a reflective material in a tire side wall and a method for manufacturing the same. The pneumatic tire of the present technology is a pneumatic tire including a decorative portion in a tire side wall decorated with a reflective material, wherein at least one recess is formed in the decorative portion and the reflective material is adhered within the recess.

20 Claims, 4 Drawing Sheets

PNEUMATIC TIRE AND METHOD OF MANUFACTURING THE SAME

PRIORITY CLAIM

Priority is claimed to Japan Patent Application Serial No. 2012-71807 filed on Mar. 27, 2013.

BACKGROUND OF THE TECHNOLOGY

The present technology relates to a pneumatic tire including a decorative portion decorated with a reflective material in a tire side wall and a method for manufacturing the same, and more specifically relates to a pneumatic tire that can prevent the reflective material from falling off and can maintain visibility and fashionability based on the reflective material over a long period of time and a method for manufacturing the same.

Proposals concerning a pneumatic tire have been made for the purpose of improving visibility and fashionability by covering an outer surface of a tire (for example, a side wall portion) with a coating material, coloring agent, or the like (see, for example, Japanese Unexamined Utility Model Application Publication No. H7-37713 and Japanese Unexamined Patent Application Publication (translation of PCT application) No. 2004-526814), and by forming a side wall portion of a tire using a rubber composition that blends phosphors, ultramarine, or the like (see, for example, Japanese Unexamined Patent Application Publication No. 2000-185528A, Japanese Unexamined Patent Application Publication No. 2008-174639A, and Japanese Unexamined Patent Application Publication (translation of PCT application) No. 2009-538768).

However, with the method of simply applying a coating material, a coloring agent, or the like on to the outer surface of the tire, there is a problem in that scratches are formed in a colored portion or the colored portion falls off when the tire contacts an object such as a curb or the like.

Meanwhile, with the method of blending phosphors, ultramarine, or the like into the rubber composition constituting the tire, there is a problem in that an effect of improving visibility and fashionability may be insufficient due to the existence of other additives such as carbon black blended into the rubber composition.

SUMMARY OF THE TECHNOLOGY

The present technology provides a pneumatic tire that can prevent a reflective material from falling off and can maintain visibility and fashionability based on the reflective material over a long period of time when providing a decorative portion decorated with the reflective material in a tire side wall and a method for manufacturing the same.

The pneumatic tire of the present technology is a pneumatic tire including a decorative portion decorated with a reflective material in a tire side wall, wherein at least one recess is formed in the decorative portion, and the reflective material is adhered within the recess.

A method for manufacturing the pneumatic tire of the present technology is a method for manufacturing the pneumatic tire including vulcanizing the pneumatic tire including the decorative portion in the tire side wall, the decorative portion having the recess, and adhering the reflective material to the decorative portion having the recess.

In the present technology, when providing the decorative portion decorated with the reflective material in the tire side wall, at least one recess is formed in the decorative portion, and the reflective material is adhered within the recess to thereby prevent the reflective material from falling off when the tire contacts an object such as a curb or the like. Further, because the reflective material is adhered within the recess, scratch durability and weatherability of the reflective material can also be improved. Therefore, the visibility and fashionability based on the reflective material can be maintained over a long period of time. Furthermore, the recess has a larger surface area than a flat area, thereby enabling a greater amount of reflective material to be adhered and to diversify the orientation of the reflective material; therefore, visibility and fashionability based on the reflective material can be further increased to thereby enable a secondary effect.

In the present technology, although the recess can be configured from a groove or a dimple, a groove particularly allows the reflective material to simply and cleanly adhere within the recess. In either case, a depth of the recess is preferably not less than 0.2 mm and not more than 2 mm. By this, the effect of preventing the reflective material from falling off, visibility and fashionability can be achieved simultaneously.

Preferably, the recess has an inclined face that inclines relative to a normal line direction of the tire surface, and a ratio of a length of the reflective material to a width of the inclined face of the recess is from 0.3 to 0.95. Further, preferably, the recess has a bottom surface parallel to the tire surface, and a ratio of the length of the reflective material to a width of the bottom surface of the recess is from 0.3 to 0.95. By this, the effect of preventing the reflective material from falling off, visibility and fashionability can be achieved simultaneously.

Further, it is preferred that a small protrusion be provided at a position above a maximum depth portion of the recess, protruding into the recess. By this, the effect of preventing the reflective material from falling off can be further increased.

When manufacturing the pneumatic tire described above, the pneumatic tire including the decorative portion having the recess in the tire side wall may be vulcanized and the reflective material may be adhered to the decorative portion having the recess. It is particularly preferred that the reflective material be bonded to the decorative portion having the recess using an adhesive.

In the method for manufacturing this type of pneumatic tire, it is preferred that the reflective material be compression bonded to the decorative portion using a rigid body after the adhering of the reflective material to the decorative portion having the recess. By this, the adhered state of the reflective material can be improved.

Further, in the method for manufacturing the pneumatic tire, it is preferred that buffing be performed for the decorative portion after the adhering of the reflective material to the decorative portion having the recess, and the reflective material that has adhered to sites away from the recess of the decorative portion is removed. Because the reflective material that has adhered to sites away from the recess of the decorative portion is easily removed, removing this in advance allows the reflective material to maintain a stable state over a long period of time.

BRIEF DESCRIPTION OF THE DRAWINGS

FIG. 1 is a perspective cross-sectional view illustrating the main parts of a pneumatic tire according to an embodiment of the present technology.

DETAILED DESCRIPTION OF THE EMBODIMENTS

Figure 1:
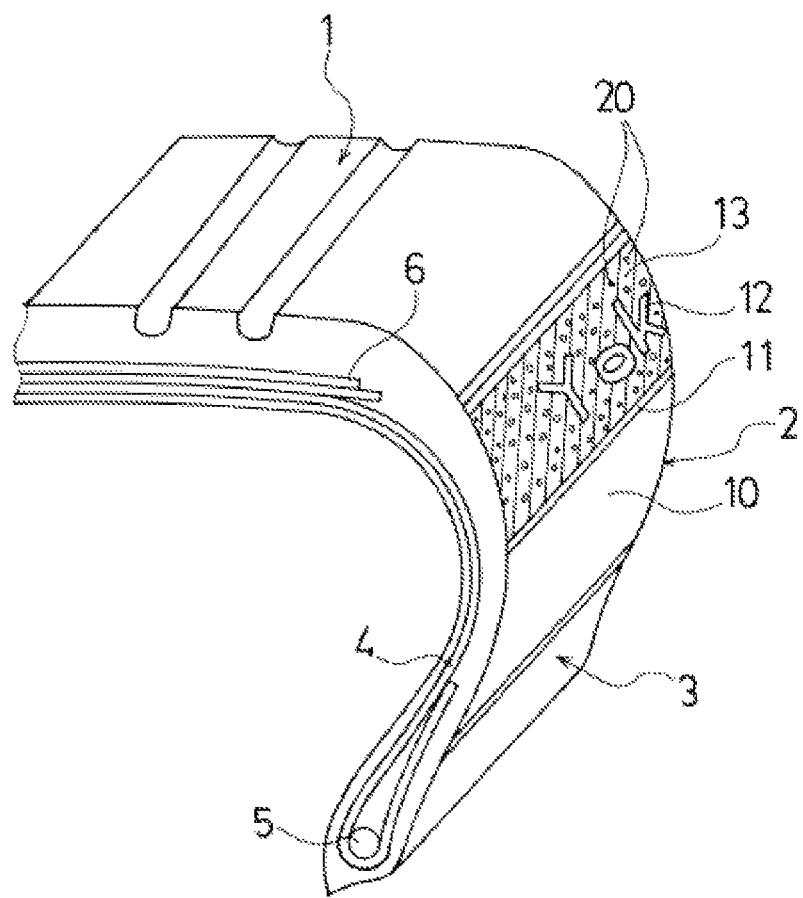

Detailed descriptions will be given below of a configuration of the present technology with reference to the accompanying drawings. FIG. 1 illustrates a pneumatic tire according to an embodiment of the present technology.

As illustrated in FIG. 1, the pneumatic tire of this embodiment includes a tread portion 1, a pair of side wall portions 2 disposed on both sides of the tread portion 1, and a pair of bead portions 3 disposed inward in a tire radial direction of the side wall portions 2. A carcass layer 4 is mounted between the pair of bead portions 3, 3. The carcass layer 4 is folded back around a bead core 5 disposed in each of the bead portions 3 from the tire inner side to the tire outer side. On the other hand, a plurality of layers of a belt layer 6 is embedded on an outer circumferential side of the carcass layer 4 in the tread portion 1.

In the pneumatic tire, a band-like decorative portion 11 that extends in the tire circumferential direction is formed in a tire side wall 10 (outer surface of the side wall portion 2 or the bead portion 3) for the purpose of improving visibility and fashionability. The decorative portion 11 may include a markings 12 constituted by letters, numbers, symbols, emblems, and the like, or it may be a simple pattern that does not include the markings 12. A plurality of recesses 13 is formed in the decorative portion 11, and a reflective material 20 is adhered within the recesses 13.

Figure 2:
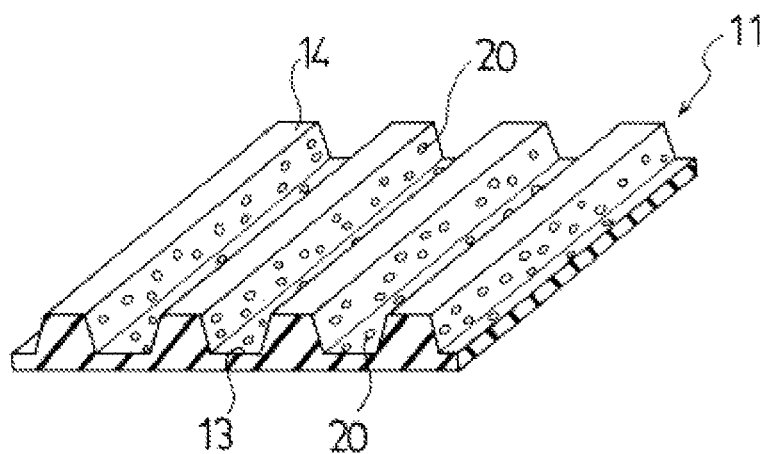
FIG. 2 is a perspective cross-sectional view illustrating one example of a decorative portion in the pneumatic tire according to the present technology.
Figure 3:
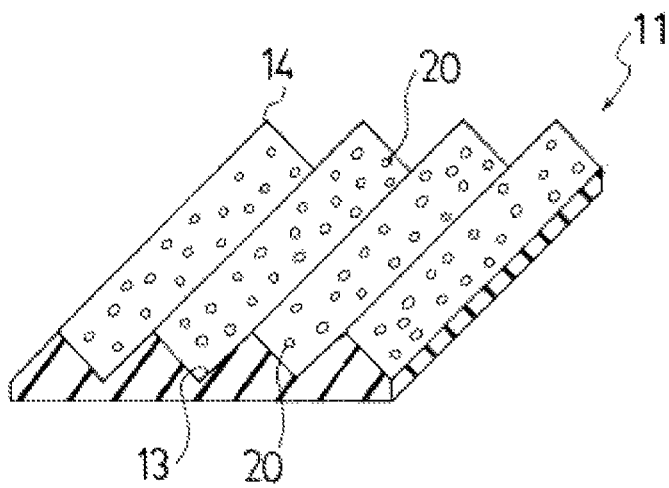
FIG. 3 is a perspective cross-sectional view illustrating a modified example of a decorative portion in the pneumatic tire according to the present technology.
Figure 4:
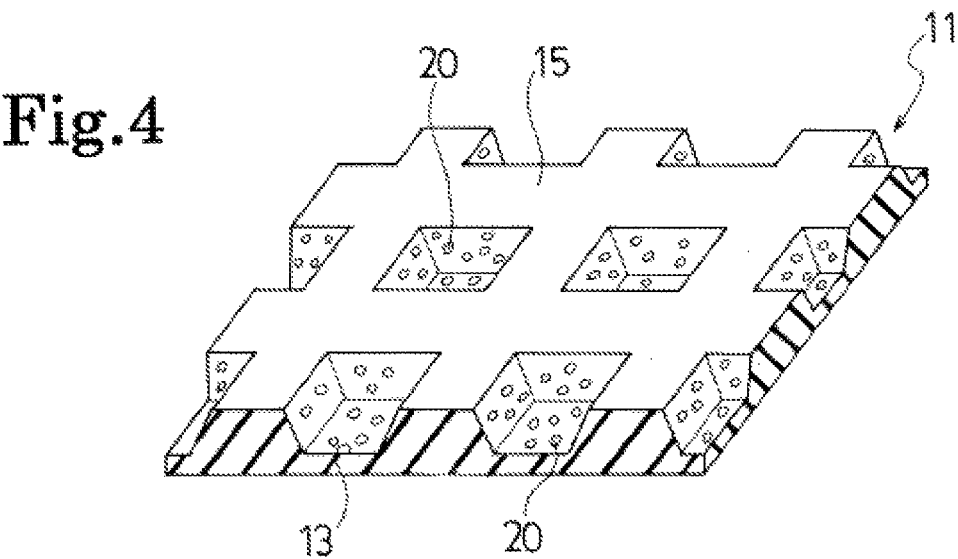
FIG. 4 is a perspective cross-sectional view illustrating another modified example of a decorative portion in the pneumatic tire according to the present technology.

FIG. 2 to FIG. 4 respectively illustrate a decorative portion in the pneumatic tire according to the present technology. In FIG. 2, a plurality of ridges 14 that protrude from the tire surface are formed on the decorative portion 11 so as to mutually extend in parallel, and the recesses 13 constituted by grooves are formed between the ridges 14. Although the recesses 13 constituted by grooves are formed here between the ridges 14 that protrude from the tire surface, the plurality of recesses 13 constituted by grooves that are recessed from the tire surface may be formed so as to mutually extend in parallel such that the ridges 14 remain between the recesses 13. The lateral cross-sectional shape of the ridges 14 forms a trapezoid, and the lateral cross-sectional shape of the recesses 13 constituted by grooves forms an inverted trapezoid. In addition, the reflective material 20 is adhered within the recesses 13 constituted by grooves. Further, as illustrated in FIG. 3, the lateral cross-sectional shape of the ridges 14 may form a triangle, and the lateral cross-sectional shape of the recesses 13 constituted by grooves may form an inverted triangle.

In FIG. 4, a honeycomb-shape protrusion 15 that protrudes from the tire surface is formed on the decorative portion 11, and recesses 13 constituted by dimples are formed between the honeycomb-shape protrusions 15. Although the recesses 13 constituted by dimples are formed here between the honeycomb-shape protrusion 15 that protrudes from the tire surface, the plurality of recesses 13 constituted by dimples that recessed from the tire surface may be formed such that the honeycomb-shape protrusion 15 remains between the recesses 13. The honeycomb-shape protrusion 15 has a lateral cross-sectional shape of the honeycomb portion that forms a trapezoid, and the recesses 13 constituted by dimples has a lateral cross-sectional shape that forms an inverted trapezoid. In addition, the reflective material 20 is adhered within the recesses 13 constituted by dimples.

As the reflective material 20, small pieces for a thin plate shape or a scaled leaf shape having a length of from 50 µm to 1500 µm may be used. This type of small piece easily follows the deformation of the tire surface according to the rolling motion of the tire, and as such, is difficult to fall off. Examples of specific material include polyethylene terephthalate (PET), aluminum, mica, talc, and the like. These materials have a high reflectivity.

In the pneumatic tire described above, when providing the decorative portion 11 decorated with the reflective material 20 in the tire side wall 10, the plurality of recesses 13 is formed in the decorative portion 11, and the reflective material 20 is adhered within the recesses 13, and therefore, the reflective material 20 can be prevented from falling off when the tire contacts an object such as a curb. Further, because the reflective material 20 is adhered within the recesses 13, the scratch durability and weatherability of the reflective material 20 can also be improved. Therefore, the visibility and fashionability based on the reflective material 20 can be maintained over a long period of time. Furthermore, the recess 13 has a larger surface area than a flat area, thereby enabling a greater amount of the reflective material 20 to be adhered. In addition, the reflective material 20 is oriented in various directions according to the inclined direction of the inner surface of the recess 13 so as to provide a sheen having a stereoscopic effect, and therefore, the visibility and fashionability based on the reflective material 20 is further increased.

Figure 5:
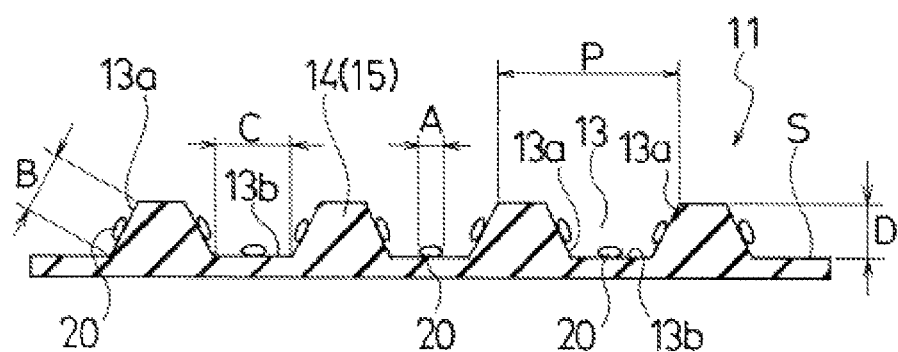
FIG. 5 is a cross-sectional view illustrating a dimensional relationship of the decorative portion in the pneumatic tire according to the present technology.

FIG. 5 illustrates a dimensional relationship of the decorative portion in the pneumatic tire according to the present technology. A depth D of the recess 13 is preferred to be not less than 0.2 mm and not more than 2 mm, and particularly for a pneumatic tire for a passenger car, it is preferred to be not less than 0.2 mm and not more than 1.5 mm. By this, the effect of preventing the reflective material 20 from falling off, visibility and fashionability can be achieved simultaneously. When the depth D of the recess 13 falls below the lower limit value, the effect of preventing the reflective material 20 from falling off is reduced, and conversely, when exceeding the upper limit value, the reflective material 20 is buried and visibility is reduced. In addition, when providing the ridge 14, there is a problem in that the ridge 14 becomes easy to tear off when the depth D of the recess 13 exceeds the upper limit value.

A pitch P of the recess 13 is preferred to be not more than 3 mm, and particularly for a pneumatic tire for a passenger car, it is preferred to be not more than 2.0 mm. By this, the effect of preventing the reflective material 20 from falling off can be made appropriate. When the pitch P of the recess 13 exceeds the upper limit value, the effect of preventing the reflective material 20 from falling off is reduced.

When the recess 13 has an inclined face 13a that inclines to a normal line direction of the tire surface S, a ratio (A/B) of a length A of the reflective material 20 to a width B of the inclined face 13a of the recess 13 is preferably in a range from 0.3 to 0.95. Further, when the recess 13 has a bottom surface 13b that is parallel to the tire surface S, a ratio (A/C) of the length A of the reflective material 20 to a width C of the bottom surface 13b of the recess 13 is preferably in a range from 0.3 to 0.95. By this, the effect of preventing the reflective material 20 from falling off, visibility and fashionability can be achieved simultaneously. When the ratio (A/B) or the ratio (A/C) is below 0.3, the reflective material 20 is too small and visibility is reduced, and conversely, when the ratio (A/B) or the ratio (A/C) exceeds 0.95, the reflective material 20 becomes difficult to enter the bottom side of the recess 13, and thus, the effect of preventing the reflective material 20 from falling off is reduced.

Figure 6:
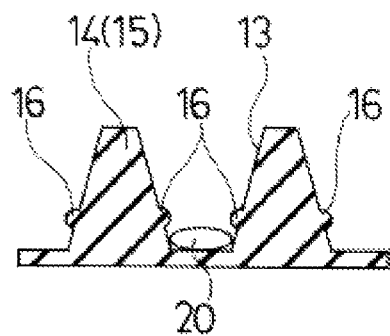
FIG. 6 is a cross-sectional view illustrating one example of a recess formed in the decorative portion of the pneumatic tire according to the present technology and a small protrusion formed in the recess.
Figure 7:
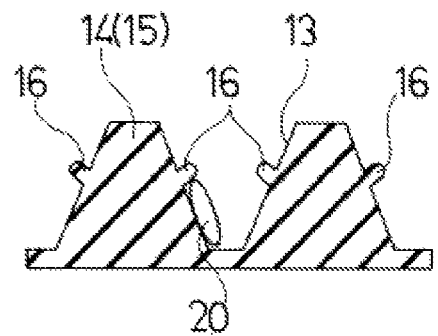
FIG. 7 is a cross-sectional view illustrating a modified example of a recess formed in the decorative portion of the pneumatic tire according to the present technology and a small protrusion formed in the recess.

FIG. 6 and FIG. 7 are respectively cross-sectional views illustrating a recess formed in the decorative portion of the pneumatic tire according to the present technology and a small protrusion formed in the recess. In FIG. 6 and FIG. 7, the small protrusion 16 is formed at a position above a maximum depth portion of the recess 13, protruding into the recess 13. The cross-sectional shape of the small protrusion 16 is not particularly limited and may contiguously extend along the tire surface or it may intermittently extend along the tire surface.

When this type of small protrusion 16 is formed in the recess 13, as illustrated in FIG. 6 and FIG. 7, the reflective material 20 that has adhered to the bottom side of the recess 13 is locked by the small protrusion 16, and therefore, the effect of preventing the reflective material 20 from falling off can be further increased. Of course, scratches due to fine gravel or the like and peeling due to wind and rain can be effectively prevented. Note that the protruding height of the small protrusion 16 from the inner surface of the recess 13 is preferably not more than 1.5 mm. If the protruding height of the small protrusion 16 is too high, the luminescent effect of the reflective material 20 is blocked.

When manufacturing the pneumatic tire described above, after the pneumatic tire provided with the decorative portion 11 having the recess 13 in the tire side wall 10 has been vulcanized, the reflective material 20 is adhered to the decorative portion 11 having the recess 13. By this, the pneumatic tire described above can be obtained.

In the method for manufacturing this type of pneumatic tire, it is preferred that the reflective material 20 be compression bonded to the decorative portion 11 using a rigid body after the adhering of the reflective material 20 to the decorative portion 11 having the recess 13. By this, the adhered state of the reflective material 20 can be improved. Note that, a rigid body having a shape that conforms to the inner surface shape of the recess 13 is preferred so as to contact with the inner surface of the recess 13. For example, in the case of the recess 13 constituted by grooves such as that illustrated in FIG. 2 and FIG. 3, use of a disk shaped roller that conforms to the grooves allows the work of compression bonding to be performed simply.

Further, in the method for manufacturing the pneumatic tire, it is preferred that buffing be performed for the decorative portion 11 after the adhering of the reflective material 20 to the decorative portion 11 having the recess 13, and the reflective material 20 that has adhered to sites away from the recess 13 of the decorative portion 11 is removed. In other words, when adhering the reflective material 20 to the decorative portion 11 having a recess 13, reflective material 20 is also adhered to sites that are away from the recess 13 of the decorative portion 11. It is acceptable for the reflective material 20 to adhere excessively in this manner. However, because the reflective material 20 that has adhered to sites away from the recess 13 of the decorative portion 11 is easily removed, removing this in advance allows the reflective material 20 to maintain a stable state over a long period of time. Furthermore, when the reflective material 20 that has adhered to sites away from the recess 13 of the decorative portion 11 is removed, the appearance of the decorative portion 11 is improved.

In the present technology, although adhesion of the reflective material 20 within the recess 13 is required, more specifically, bonding the reflective material 20 within the recess 13 is desired. For example, the reflective material 20 may be blended into a liquid or gel form of adhesive having an adhesive strength, and the adhesive containing the reflective material 20 can be applied to the decorative portion 11 having a recess 13. Alternately, the adhesive may be applied in advance to the decorative portion 11 having the recess 13 and the reflective material 20 can be adhered on the layer of adhesive.

EXAMPLES

For a pneumatic tire having a tire size of 195/65R15 provided with a decorative portion in a tire side wall, a plurality of recesses made up of grooves were formed so as to extend mutually parallel in the decorative portion as illustrated in FIG. 2, and a reflective material was bonded within the recesses, and a depth D of the recesses, a pitch P of the recesses, a ratio (AB) of a length A of the reflective material to a width B of an inclined face of the recess, a ratio (A/C) of the length A of the reflective material to a width C of a bottom surface of the recess, and the presence/absence of a small protrusion within the recess were set as shown in Table 1 to produce tires of Working Examples 1 to 6. Furthermore, a tire of Comparative Example 1 had the same structure as those in Working Examples 1 to 6 other than the reflective material was bonded using an adhesive to a flat decorative portion without forming recesses in the decorative portion.

As the reflective material, small pieces having a scaled leaf shape formed from polyethylene terephthalate were used, and the dimensions thereof were appropriately selected according to the dimensions of the recess.

The appearance of the decorative portion for these tests tires was evaluated according to the following evaluation method and the results were shown in Table 1.

Appearance:

The test tires were mounted on test vehicles and the appearance of the tire surface before driving was judged by the following judgment criteria according to a visual inspection by 10 panelists respectively. Further, three months of road testing was performed, and the appearance of the tire surface after driving was judged in a similar manner. For the evaluation results, the sum of the evaluated values based on the below judgment criteria was found; A is when the value is in the range from 36 to 40, B is when the value is in the range from 26 to 35, C is when the value is in the range from 16 to 25, and D is when the value is in the range from 10 to 15.

Judgment Criteria

4: Gives a strong sense of sparkling

3: Gives a sense of sparkling

2: Gives a slight sense of sparkling

1: Gives almost no sense of sparkling

TABLE 1

| | Comparative Example 1 | Working Example 1 | Working Example 2 | Working Example 3 | Working Example 4 | Working Example 5 | Working Example 6 |
|---|---|---|---|---|---|---|---|
| Depth D of the recess (mm) | — | 0.2 | 1.5 | 1.0 | 1.0 | 1.0 | 1.0 |
| Pitch P of the recess (mm) | — | 2.0 | 2.0 | 2.0 | 2.0 | 2.0 | 2.0 |
| A/B | — | 0.5 | 0.5 | 0.5 | 0.3 | 0.95 | 0.5 |
| A/C | — | 0.5 | 0.5 | 0.5 | 0.3 | 0.95 | 0.5 |
| Presence/absence of a small protrusion in the recess | Absent | Absent | Absent | Absent | Absent | Absent | Present |
| Appearance before driving | B | A | A | A | A | A | A |
| Appearance after driving | D | B | B | B | B | B | A |

As is evident from Table 1, the tires of Working Examples 1 to 6, having a plurality of recesses formed in the decorative portion and having reflective material adhered within these recesses, had little reflective material fall off after driving and had an excellent appearance after driving compared to Comparative Example 1. Further, the tires of Working Examples 1 to 6 also had an excellent appearance before driving compared to Comparative Example 1.

The invention claimed is:

1. A pneumatic tire comprising: a decorative portion in a tire side wall, the decorative portion being decorated with a reflective material, the reflective material including small thin plate shape or scaled leaf shape pieces of reflective material having a length of from 400 μm to 1500 μm, wherein at least one recess is formed in the decorative portion, and the pieces of reflective material are placed on an inner surface of the at least one recess to be adhered to the inner surface of the at least one recess; and a small protrusion that is provided at a position above a maximum depth portion of the at least one recess, protruding into the recess, the reflective material being located near a bottom side of the recess and being adhered to the bottom side of the recess and locked by the small protrusion, which prevents the reflective material from falling off.

2. The pneumatic tire according to claim 1, wherein the at least one recess is a groove.

3. The pneumatic tire according to claim 1, wherein the at least one recess is a dimple.

4. The pneumatic tire according to claim 1, wherein a depth of the at least one recess is not less than 0.2 mm and not more than 2 mm.

5. The pneumatic tire according to claim 1, wherein a depth of the at least one recess is not less than 0.2 mm and not more than 1.5 mm.

6. The pneumatic tire according to claim 1, wherein the at least one recess comprises at least two recesses and a pitch of the at least two recesses is not more than 3.0 mm.

7. The pneumatic tire according to claim 1, wherein the at least one recess comprises at least two recesses and a pitch of the at least two recesses is not more than 2.0 mm.

8. The pneumatic tire according to claim 7, wherein a protruding height of the small protrusion is not more than 1.5 mm.

9. The pneumatic tire according to claim 1, wherein: the at least one recess has an inclined face that inclines relative to a normal line direction of the tire surface, and a ratio of a length of the reflective material to a width of the inclined face of the recess is from 0.3 to 0.95.

10. The pneumatic tire according to claim 1, wherein: the at least one recess has a bottom surface parallel to the tire surface, and a ratio of a length of the reflective material to a width of the bottom surface of the at least one recess is from 0.3 to 0.95.

11. The pneumatic tire according to claim 1, wherein the at least one recess comprises a plurality of recesses extending at an oblique angle relative to the tire circumferential direction.

12. The pneumatic tire according to claim 1, wherein the at least one recess comprises an opening opposite the bottom side, the opening being a widest portion of the recess.

13. A method for manufacturing a pneumatic tire comprising a decorative portion in a tire side wall, the decorative portion being decorated with a reflective material, the reflective material including small thin plate shape or scaled leaf shape pieces of reflective material having a length of from 400 μm to 1500 μm, wherein at least one recess is formed in the decorative portion, and the reflective material is adhered within the at least one recess, a small protrusion being provided at a position above a maximum depth portion of the at least one recess, protruding into the at least one recess, the reflective material being located near a bottom side of the recess; the method comprising:

vulcanizing the pneumatic tire comprising the decorative portion in the tire side wall, the decorative portion having the at least one recess, and adhering the reflective material to the decorative portion having the at least one recess, the reflective material adhered to the bottom side of the recess and locked by the small protrusion, which prevents the reflective material from falling off.

14. The method for manufacturing a pneumatic tire according to claim 13, comprising: compression bonding the reflective material to the decorative portion using a rigid body after the adhering of the reflective material to the decorative portion having the at least one recess.

15. The method for manufacturing a pneumatic tire according to claim 13, comprising buffing the decorative portion after the adhering of the reflective material to the decorative portion having the at least one recess, and removing the reflective material that has adhered to sites away from the at least one recess of the decorative portion.

16. The method for manufacturing a pneumatic tire according to claim 13, wherein the at least one recess is a groove.

17. The method for manufacturing a pneumatic tire according to claim 13, wherein the at least one recess is a dimple.

18. The method for manufacturing a pneumatic tire according to claim 13, wherein a depth of the at least one recess is not less than 0.2 mm and not more than 2 mm.

19. The method for manufacturing a pneumatic tire according to claim 13, wherein: the at least one recess has an inclined face that inclines relative to a normal line direction of the tire surface, and a ratio of a length of the reflective material to a width of the inclined face of the at least one recess is from 0.3 to 0.95.

20. The method for manufacturing a pneumatic tire according to claim 13, wherein: the at least one recess has a bottom surface parallel to the tire surface, and a ratio of a length of the reflective material to a width of the bottom surface of the at least one recess is from 0.3 to 0.95.

* * * * *